July 25, 1950 E. E. SEGER 2,516,808
WINDSHIELD WIPER
Filed Oct. 9, 1944

Inventor
Elbert E. Seger
By
Blackmon, Spencer & Flint
Attorneys

Patented July 25, 1950

2,516,808

UNITED STATES PATENT OFFICE 2,516,808

WINDSHIELD WIPER

Elbert E. Seger, Milford, Mich., assignor to General Motors Corporation, Detroit, Mich., a corporation of Delaware Application October 9, 1944, Serial No. 557,759

4 Claims. (Cl. 15—253)

This invention relates to windshield wipers and its main object is to increase the area of the glass to be swept by the wiper blade. The invention has particular utility when applied to a windshield mounted to lie in a plane considerably displaced from the vertical. It is then desirable that the upper reach of the cleaner should be further from the axis of the motor shaft than in the conventional construction so that the vertical component may be approximately equal to that of a conventionally driven wiper operating on a vertically positioned windshield.

The invention is illustrated on an accompanying drawing in which.

Figure 2:
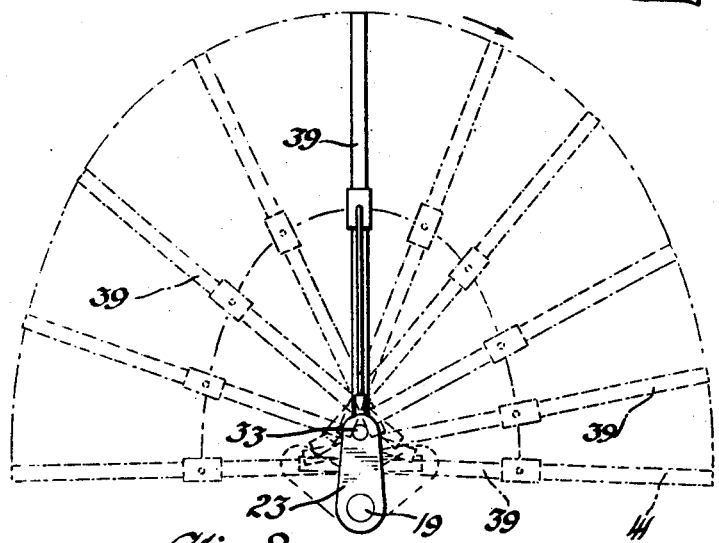
Fig. 2 is a diagrammatic view showing the parts in a plurality of positions.
Figure 3:
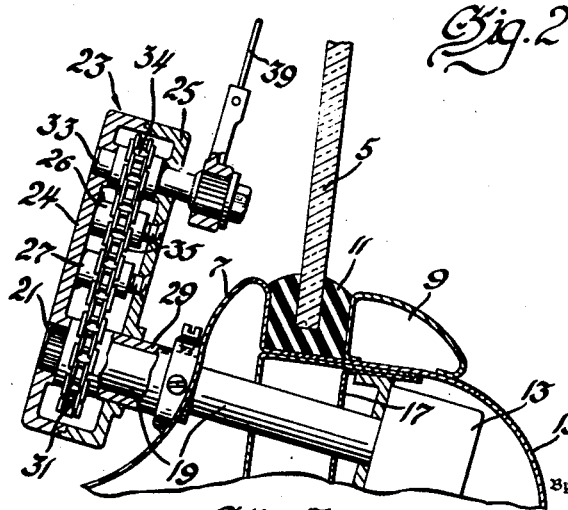
Fig. 3 is a transverse section at a right angle to the windshield.
Figure 4:
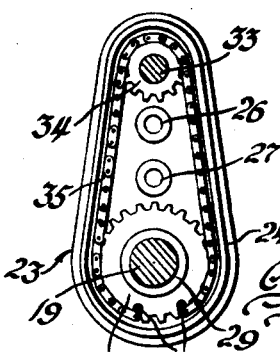
Fig. 4 is a view in elevation of the operating means within a swinging arm.

Referring by reference characters to the drawing a windshield of glass is seen at 5. It is seated between body parts 7 and 9 by sealing means 11. The motor is seen at 13 concealed by parts 15 and 17. Its shaft 19 extends out to a position beneath the windshield where, as at 21, there is rigidly secured to it a two-part hollow arm marked 23 made up from members 24 and 25 secured together by fastening means 26 and 27. Shaft 19 extends through a boss or hub 29 fixedly secured in any convenient way to the part 7, and the bottom of the hollow arm part 25 may turn on the boss 29. Within the hollow arm is a wheel or toothed gear marked 31. It is securely fixed to the boss 29 and does not rotate with the arm. At the end of the arm remote from shaft 19 is a rotatably mounted pin 33 carrying fixed thereto a second wheel member or pinion 34 of smaller diameter than pinion 31. To pin 33 is fixed a blade carrying arm 39 which as shown in Figure 2 is relatively long in comparison to arm 23. A chain 35 has its mid portion trained over pinion 34. Its end portions engage teeth of pinion 31 but as shown the extreme ends may be made fast to the fixed pinion 31 as at 37.

Figure 1:
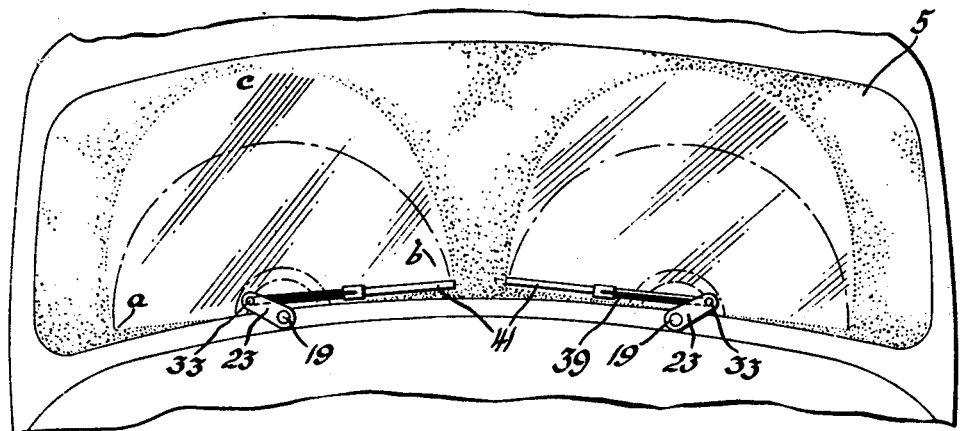
Fig. 1 is a view in front elevation.

In operation the motor, which may be of the usual kind, the shaft of which oscillates to and fro, rocks shaft 19 and with it the arm 23. The pin 33 describes a circular arc about shaft 19 as a center. However, as the arm is rocked from its mid position clockwise (to the right as indicated by the arrow in Fig. 2) the chain anchored on the fixed wheel 31 wraps on the teeth of this wheel and thereby rotates wheel 34 counterclockwise so that the wiper arm 39 approaches the position shown at the right of Fig. 1. When the arm is rocked counterclockwise toward the position shown at the left in Fig. 1, the arm 23 and the wiper arm 39 approach the position there shown. The path of the blade 41 carried by the arm 39 will be as shown. It will therefore be seen that the area swept by the blade will have an outer margin which is not circular but which is more remote from the axis of rotation 19 in the mid position of the arm 23 than in the end positions. In an arrangement so proportioned that the blade may reach the desired outermost points as at $a$ and $b$ when the arm is substantially parallel to the base of the windshield the mid position is such that the point C is more remote from the axial center at 19 than are points $a$ and $b$. Not only is there thus provided an additional area of cleaned glass but, in the case of windshields sloping toward the rear, the vertical component of the rearwardly sloping arm assembly may be sufficient to equal the vertical height of glass which would be cleaned in the case of a vertically positioned windshield where the expedient of this invention is not used.

It may be explained that while the elements 31 and 34 have been described and shown as toothed wheels and the element 35 as a chain, the use of other flexible means anchored on a fixed equivalent of wheel 31 but without the toothed periphery and trained over a similar equivalent of wheel 34 is contemplated and is intended to lie within the field embraced by the invention and defined by the claims. Other mechanical equivalents also are intended to be within the inventive idea.

I claim:

1. In a windshield cleaner, a first rockshaft, a short arm connected at one end to said first rockshaft, means to rock said rockshaft and arm between extreme positions spaced apart by a small angle and through a mean position, a second rockshaft pivotally mounted on the other end of said arm, a relatively long blade arm fixed to the second rockshaft, said blade arm constituting a linear extension of said first arm in the mean position of the latter and means acting in response to rotation of said first arm to rotate said second rockshaft through substantially more than said small angle in a direction opposite that of the first arm to position said blade arm on the opposite side of the first rockshaft from the first arm when the first arm is in either extreme position.

2. In a windshield cleaner, a body, a first rockshaft mounted in said body and having a terminal end extending therefrom, means to rock said rockshaft, a boss fixed to said body and surrounding said rockshaft, a hollow arm attached to the terminal end of said rockshaft and enclosing a portion of said boss, a second rockshaft pivotally mounted on said hollow arm, means located in said hollow arm connecting said boss and said second rockshaft to rotate said second rockshaft in a direction opposite that of said first rockshaft, a blade arm fixed to said second rockshaft.

3. In a windshield cleaner, a body, a first rockshaft mounted in said body and having a terminal end extending therefrom, means to rock said first rockshaft, a boss fixed to said body and surrounding said first rockshaft, a relatively short arm formed of a plurality of parts and having an enclosed cavity therein, an aperture in a side wall of said arm adjacent one end, said first rockshaft and boss extending through said aperture into said cavity, the terminal end of said first rockshaft being attached to said arm, a second aperture in a side wall of said arm adjacent the other end, a second rockshaft pivoted in said second aperture and extending into said cavity, means located in the cavity of said arm connecting said boss and said second rockshaft to rotate said second rockshaft upon rotation of said first rockshaft, and a relatively long blade arm fixed to said second rockshaft.

4. In a windshield cleaner, a first rockshaft, a short arm connected at one end to said first rockshaft, means to rock said rockshaft and arm between extreme positions substantially less than 180° apart through a mean position, a second rockshaft pivotally mounted on the other end of said arm, a relatively long blade arm fixed to the second rockshaft, said blade arm constituting a linear extension of said first arm in the mean position of the latter and means acting in response to rotation of said first arm to rotate said second rockshaft through substantially more than 180° relative to said short arm in a direction opposite that of the first arm to position said blade arm on the opposite side of the first rockshaft from the first arm when the first arm is in either extreme position.

ELBERT E. SEGER.

REFERENCES CITED

The following references are of record in the file of this patent:

UNITED STATES PATENTS

| Number | Name | Date |
|---|---|---|
| 1,866,700 | Farmer | July 12, 1932 |
| 1,964,109 | Cusset | June 26, 1934 |
| 2,191,356 | Snell | Feb. 20, 1940 |
| 2,274,295 | Horton | Feb. 23, 1942 |
| 2,279,983 | Goode et al. | Apr. 14, 1942 |